United States Patent [19]

Bartz

[11] Patent Number: 4,840,993

[45] Date of Patent: * Jun. 20, 1989

[54] IMPACT-RESISTANT POLYAMIDE MOLDING COMPOUNDS

[75] Inventor: Wilfried Bartz, Marl, Fed. Rep. of Germany

[73] Assignee: Huels Aktiengesellschaft, Marl, Fed. Rep. of Germany

[ * ] Notice: The portion of the term of this patent subsequent to Jul. 5, 2005 has been disclaimed.

[21] Appl. No.: 40,917

[22] Filed: Apr. 21, 1987

[30] Foreign Application Priority Data

Apr. 22, 1986 [DE] Fed. Rep. of Germany ....... 3613528

[51] Int. Cl.$^4$ .................. C08L 45/00; C08L 77/00
[52] U.S. Cl. ...................................... 525/66; 525/184
[58] Field of Search ................... 525/184, 66

[56] References Cited

U.S. PATENT DOCUMENTS

| 4,251,644 | 2/1981 | Joffrion | 525/184 |
| 4,755,552 | 7/1988 | Jadamus | 524/491 |

FOREIGN PATENT DOCUMENTS

| 52-13548 | 2/1977 | Japan | 525/184 |
| 53-51006 | 5/1978 | Japan | 525/184 |
| 55-123640 | 9/1980 | Japan | 525/184 |

*Primary Examiner*—C. Warren Ivy
*Attorney, Agent, or Firm*—Millen & White

[57] ABSTRACT

Impact-resistant polyamide molding compound consisting of a mixture of
 A. 60 to 98% by weight of a polyamide and
 B. 2 to 40% by weight of a polyalkenamer, wherein the mixture is treated at elevated temperatures with 0.05 to 5% by weight of the sum of components A and B of an organic radical former are provided as well as processes for making them.

20 Claims, No Drawings

IMPACT-RESISTANT POLYAMIDE MOLDING COMPOUNDS

CROSS REFERENCE TO RELATED APPLICATION

This application is related to U.S. Ser. No. 040,896 filed on Apr. 21, 1987 and now U.S. Pat. No. 4,755,552 whose disclosure is fully incorporated by reference herein.

BACKGROUND OF THE INVENTION

This invention relates to impact-resistant polyamide molding compounds.

Polyamides are known and proven construction materials which can be processed, e.g., by injection molding or extrusion processes. In general, polyamides, especially after conditioning, exhibit good toughness. However, for certain uses, improvements with respect to impact strength and notch impact strength in the injection fresh condition (i.e., immediately after injection molding) and especially at low temperatures (e.g. down to $-40°$ C.) are desirable.

A suitable way of approaching this goal is the use of polyamide blends, i.e. intimate mixtures of polyamides with tough elastomers or tough, high-molecular weight thermoplastics. Special primary properties of these added polymers can thus be transferred to the polyamide blends without destroying the typical polyamide properties.

To obtain polyamide blends with satisfactory properties in each case the polymers to be mixed in are optimized for the specific use and the respective polyamide type employed in the blend. Since such special polymers are not available on the market in the necessary variety, as a rule there is the problem that in each case special products in mostly small amounts must be produced in a cost-intensive way.

Because of these problems, in practice an alternative approach is taken in the production of polyamide-blend polymers which requires the use of olefinic polymers, available in large amounts and varieties, e.g., polyethylene or ethylene/proplene/diene copolymers, which exhibit a high cold or notch toughness.

According to DE-PS 11 31 883, mixtures of (1) polycondensates containing carbonamide groups; (2) polyolefins, polystyrene, olefin or styrene copolymers, which, besides olefin or styrene, can also contain other olefinic unsaturated monomers incorporated by polymerization; and (3) catalysts forming radicals are homogenized at 50° to 350° C., whereby graft copolymers are believed to form from (1) and (2). However, the products thus obtained are not completely satisfactory.

The obviously preferred and most effective embodiment of the alternative approach discussed above consists of the grafting of high-molecular weight olefinic elastomers preferably with, e.g., maleic anhydride, according to the working processes described in DE-OS 24 01 149. However, such processes have the disadvantage that because of the action of maleic anhydride, which is greatly hazardous to health, the reaction cannot easily be performed in the usual industrial installations. Moreover, the efficient elastomers are difficult to handle because of their tackiness, and because necessary machines develope a high shear power and due to the thermal stress involved, the graft process often results in damages to the elastomers by discoloration, decomposition and/or partial cross-linking. Polyamide blends with such added polymers are described in DE-OS 26 22 973.

All the products that can be used for the alternative method described above must exhibit a high molecular weight and consequently have high melting viscosities, if they are to produce good results in the polyamide blends. At the same time optimal properties and efficiency are attained only if the added polymers are finely dispersed in the polyamide matrix. This incorporation causes difficulties because of the high viscosity of the added polymers and the relatively low viscosity of the polyamides and the thus unfavorable polyamide/added polymer viscosity relation. Fluctuations in the flow rate and shearing conditions make the production of a reproducibly good quality difficult. Use of the mixing aggregates possessing a high shear power does reduce the scattering of the values but requires a high energy expenditure and can result in damage to the polyamide blends.

SUMMARY OF THE INVENTION

It is an object of this invention to avoid the disadvantages of the prior art while at the same time maintaining the known desired properties of polyamide blends.

Upon further study of the specification and appended claims, further objects and advantages of this invention will become apparent to those skilled in the art.

In a composition aspect, these objects have been achieved by providing polyamide molding compositions comprising an intimate mixture of A. from about 60 to about 98% by weight of a polyamide having an $Eta_{rel}$ value in the range of from about 1.2 to about 2.4 (measured according to DIN 53 727 in m-cresol at 25° C. and a concentration of 0.5 g/100 cm$^3$ of solution)

and

B. from about 2 to about 40% by weight of a polyalkenamer having a viscosity number in the range of from about 50 to 250 ml/g (measured according to DIN 53 726 in toluene at 25° C. and a concentration of 0.5 g/100 cm$^3$ of solution), said mixture having been treated at elevated temperatures with from about 0.05 to about 5% by weight, relative to the sum of components A and B, of an organic free radical former.

In a method aspect, these objects have been achieved by providing a method for improving the impact strength of polyamide molding compositions, epecially at low-temperatures and/or in injection fresh condition, comprising adding to an intimate mixture of A. from about 60 to about 98% by weight of a polyamide having an $Eta_{rel}$ value in the range of from about 1.2 to about 2.4 (measured according to DIN 53 727 in m-cresol at 25° C. and a concentration of 0.5 g/100 cm$^3$ of solution)

and

B. from about 2 to about 40% by weight of a polyalkenamer having a viscosity number in the range of from about 50 to 250 ml/g (measured according to DIN 53 726 in toluene at 25° C. and a concentration of 0.5 g/100 cm$^3$ of solution), from about 0.05 to about 5% by weight of the sum of components A and B, of an organic free radical former and subjecting said mixture to a temperature sufficient to cause said radical former to decompose into free radicals.

DETAILED DESCRIPTION OF THE INVENTION

As suitable polyamides (component A) can be used the homopolyamides PA 11, 12, 68, 69, 610, 612 or the corresponding copolyamides, optionally made by using as monomers (cyclo) aliphatic diamines and/or aliphatic or aromatic dicarboxylic acids and/or aminocarboxylic acids or their lactams, each having 6 to 12 carbon atoms. The monomers which can be employed to produce the homopolyamides are self-evident. The monomers which can be employed to produce the copolyamides are hexamethylenediamine and isophoronediamine, adipic acid, azelaic acid, suberic acid, dodecandionic acid, isophthalic acid, terephthalic acid, aminoundecanoic acid, aminododecanoic acid, caprolactam or laurolactam.

In general, the polyamides employed in accordance with the invention should contain at least 5 mole %, preferably at least 10 mole % and especially preferably at least 20 mole % of monomer of the group of aliphatic alkylendiamines, aminoalkanoic acids or dicarboxylic acids having at least 8C atoms. When polyalkenamers with functional groups are employed polyamides containing only monomers with less than 8 carbon atoms can advantageously be used.

The polyamides exhibit a relative solution viscosity $ETA_{rel}$ (measured according to DIN 53 727 in m-cresol at 25° C. and a concentration of 0.5 g/100 cm$^3$ of solution) of from about 1.2 to about 2.4 preferably of from about 1.5 to about 2.4. The value of the relative solution viscosity is equal to the quotient of the values of the dynamic viscosities of the solution of the polyamide and of the pure solvent.

Carboxyl and/or amino groups are usually present as end groups of the polyamides. Polyamides with nonpolar end groups can also be used. When polyalkenamers with functional end groups are used, polyamides are preferred whose end groups consist of 20 to 85%, especially 40 to 60% of amino groups.

Component A can also be a mixture of two or more polyamides, the relative amounts being non-critical.

The polyamides as such are known and can be produced according to the prior art (Kirk-Othmer, Encyclopedia of Chemical Technology, Vol. 18, p 328 to 435, John Wiley and Sons (1982); U.S. Pat. Nos. 1,071,250; 2,071,251; 2,130,523; 2,130,948; 2,241,322; 2,312,966; 2,512,606; and 3,393,210) which disclosures are incorporated by reference herein.

Suitable polyalkenamers are obtained from cyclic olefins, which exhibit at least one unsubstituted ring double bond, with the aid of so-called metathesis catalysts by opening of the ring by polymerization (DE-OSS 15 70 940, (equivalent to USP 3,459,723) 16 45 038, (equivalent to USP 3,476,728) 17 20 798, (equivalent to CA 936,647) 17 70 143 (equivalent to USP 3,632,849) and 18 05 158, (equivalent to USP 3,607,853) DE-AS 12 99 868, (equivalent to USP's 3,418,485 and 3,549,607) GB-PSS 1 124 456, 1 194 013 and 1 182 975 which disclosures ar incorporated by reference herein).

Suitable cyclic olefins include unsaturated hydrocarbons with 4 to 12 (except 6) ring carbon atoms in one or more rings e.g., 1-3 rings, which exhibit in at least one ring an unsubstituted double bond which is not in conjugation to a second double bond which may be present and which may have any degree of substitution; the substituents must not interfere with the metathesis catalysts and are preferably alkyl groups of 1 to 4 carbon atoms or a part of a cyclus of 4 to 8 carbon atoms. Examples are cyclobutene, cyclopentene, cycloheptene, cis- and trans-cyclooctene, cyclononene, cyclodecene, cycloundecene, cis- and transcyclododecene, cis-cis-cyclooctadiene-(1,5), 1-methylcyclooctadiene(1,5), 3-methylcyclooctadiene-(1,5), 3,7-dimethylcyclooctadiene-(1,5).

The double bonds in the main chain of the polyalkenamers can be present in the cis- or trans-form.

Preferably the polyalkenamers have trans-double bonds such that the polymers exhibit a sufficient crystalline portion that at room temperature they are practically tack-free and thus can easily be handled in granular, crumb, pellet or powder form, e.g., 50–98% of the total double bond content.

Polyalkenamers with molecular weights corresponding to a viscosity number of from about 50 to about 250 ml/g, preferably from about 80 to about 160 ml/g, measured in toluene at 25° C. at a concentration of 0.5 g/100 cm$^3$ of solution are suitable.

Polyalkenamers as such and their production are known (K. J. Ivin, Olefin Metathesis, p. 190ff-Academic Press (1983); Kautschuk & Gummi, Kunststoffe 1981, pages 185 to 190.

The polyalkenamers can contain functional groups, e.g., epoxy, carboxyl or carboxylic acid anhydride groups as functional groups can be present in the polyalkenamers. The introduction of these functional groups in the polyalkenamers takes place according to known processes in solution or in the melt.

Epoxy groups can be introduced, for example, by partial epoxidation of the double bonds with peracids. The content of epoxide oxygen should be 0.5 to 9, preferably 3 to 8 weight %. Alternatively, usable epoxy derivatives can be attained by grafting with, for example, glycidyl methacrylate. Introduction of carboxyl or carboxylic acid anhydride groups takes place by grafting with suitable unsaturated monomers, which contain carboxyl or carboxylic acid anhydride groups. Suitable carboxyl and carboxylic acid anhydride compounds are those containing 3–20 C atoms. For example, (meth)acrylic acid, maleic acid (anhydride), fumaric acid, maleic acid monoester, fumaric acid monoester, norbornenedicarboxylic acid anhydride, itaconic acid (anhydride) and similar compounds can be employed. Based on experience a grafted monomer content of 0.2 to 5% by weight, preferably of 0.5 to 4% by weight, in relation to the polyalkenamer containing functional groups, is sufficient. The modification of the polyalkenamers is not the object of this invention. A person of ordinary skill in the art can readily optimize the conditions required by routine optimization experiments and can readily determine by simple tests whether a sufficient degree of grafting exists for the desired purpose using conventional considerations. Besides the functional groups according to the invention, other functional groups or substituents can be introduced. All modification operations are performed so that no cross-linking and/or unacceptable increase in molecular weight occurs in the polyalkenamers according to conventional considerations. The gel content of the modified polyalkenamers, determined as insoluble portion in hot toluene, must be less than 10% by weight, preferably less than 5% by weight.

The molding compounds of this invention can contain from about 60 to about 98% of the polyamide. Preferably, they contain from about 70 to about 90% by weight of polyamide. Besides the polyamide, the molding compounds according to the invention contain 2 to 40% by weight, preferably 10 to 30% by weight, of polyalkenamer. When polyalkenamers are used without functional groups, their portion should preferably be 2 to 30% by weight, preferably 5 to 25% by weight.

Besides components A and B, the usual auxiliary agents and additives, such as stabilizers, processing agents, antistatic agents, coloring of flameproofing agents, etc., can be incorporated in the molding compounds according to the invention, if necessary or desirable. Typical amounts are 0,001 to 30% by weight relative to the sum of A and B. It is also possible to incorporate fillers and reinforcing fillers, such as minerals, glass or carbon fibers, micro glass balls, carbon black and the like, in amounts of 1 to 150 preferably 1 to 75% by weight relative to the sum of A and B.

Polymer additives, e.g., additional, impact resistant modifiers, etc., an also be used in minor amounts of 1–50%, preferably 1–30% by weight relative to the sum of A and B.

It is essential for the molding compounds according to this invention, that the polyalkenamers be first finely dispersed in the polyamide by melt mixing, before the activation, i.e., decomposition, of the organic radical former into free radicals. The average particle diameter of the polyalkenamer phase should be less than or equal to 10 micrometers, preferably less than or equal to 1 micrometer. The incorporation of the polyalkenamers is conveniently carried out in a commercial twin-screw kneader. If the mixing action is additionally augmented by the use of screws with e.g., kneading blocks or toothed disks, high throughputs can be obtained. The temperature of the melt is preferably maintained at from about 10° to about 80° C. above the melting temperature of the polyamides.

This is exemplary of intimate mixing for the invention, other equivalent mixing techniques being fully applicable.

Commercially available azo compounds or peroxides, preferably dialkyl peroxides or alkyl peracid esters are particularly suitable organic free radical formers for treating of the molding compounds. Suitable organic radical formers include those which are stable at room temperature and which form free radicals at elevated temperature, e.g., at 80° C. or higher. The half-lives should be preferably equalor less than 10 min. at 350° C.

Examples of particularly suitable free radical formers are t-butylperneodecanoate, t-amylperpivalate, t-butylperpivalate, bis-(3,5,5-trimethylhexanoyl)peroxide, dioctanoylperoxide, didecanoylperoxide, dilauroylperoxide, t-butyl-per-(2-ethylhexanoate), t-butylperisobutyrate, t-butyl-permaleinate, 1,1-bis-(t-butylperoxy)-3,3,5-trimethyl-cyclohexane, 1,1-bis-(t-butyl-peroxy)-cyclohexane, t-butylperoxy-isopropylcarbonate, t-butyl-per-(3,5,5-trimethylhexanoate), 2,5-dimethylhexane-2,5-diperbenzoate, t-butylperacetate, t-butyl-perbenzoate, 5-amyl-perbenzoate, 2,2-bis-(t-butyl peroxy)-butane, dicumylperoxide, 2,5-dimethylhexane-2,5-di-t-butylperoxide, t-butylcumylperoxide, bis(t-butyl peroxy)-3,5-dimethyldioxolane-1,2, di-t-butylperoxide, 2,5-dimethyl-hexine-(3)-2,5-di-t-butylperoxide, bis(t-butyl peroxy -isopropyl)-benzene as well as especially 2,2'-azo-bis-(2-acetoxybutane) and 2,2'-azo-bis-(2-acetoxypropane).

Bis-t-alkylperoxides and t-alkyl peracid esters are especially preferred.

The organic radical formers are used in amounts of from about 0.05 to 5% by weight, preferably of 0.1 to 3% by weight, in relation to the total amount of components A and B.

Treatment of the mixtures of A and B with the organic radical formers according to the invention can take place in various ways. Appropriate radical formers can be incorporated into the melt even during or immediately after mixing of A and B, under conditions that still do not cause any spontaneous decomposition of the radical formers. Optionally they can then speedily be decomposed by raising the temperature. The mixture of A and B can also be prepared separately. The organic radical former can then be added at other stages, e.g., during incorporation of other auxiliary agents and additives. In such a case, the radical former would also be added to the mixture along with such agents and additives and allowed to act.

It is also possible to add the radical former in liquid form to the mixture of A and B in solid granular form. The organic radical former is allowed to diffuse in the mixture without decomposition. In this case, the radical formers should be stable at the selected application temperature and be in liquid form; radical formers are preferred which are liquid at 50° C, preferably at 23° C. Alternatively, it is also possible to apply the radical formers in solution. The solvents can be removed during or after the decomposition phase by application of vacuum (e.g., degassing during extrusion). Suitable solvents can be readily determined by those of ordinary skill in the art. Introduction of the radical formers together with liquid auxiliary agents and additives is advantageous if no disturbance of the decomposition of the radical formers occurs. The vapor pressure of the radical formers during the impregnating phase should be below 1 bar to avoid the need for additional technical measures.

For the necessary decomposition and action of the radical former, it is sufficient, e.g., to heat the granulate treated with the organic radical former to a temperature which is above the decomposition temperature and at which the radical former exhibits a suitable half-life. With respect to the molding compound in this case the decomposition temperature of the radical former should be at least 10K, preferably at least 25K below the melting or softening temperature.

A person of ordinary skill in the art can readily choose a suitable radical former, perhaps with the aid of routine optimization experiments. The choice involves conventional considerations of the decomposition temperature or the temperature-dependent half-life of the decomposition of the free radical former and the given decomposition conditions (e.g., longer time in the case of relatively low temperature in solid phase or shorter time in the case of high temperature in the melt). These must be optimized with each other along with consideration of the thermostability of the components of the molding compound. Appropriate product data of the radical formers are known in the literature. In general with a homogeneous distribution of the radical former in the melt or in the solid phase, an action time of about 4 half-lives at the respective temperature is sufficient.

the molding compounds of this invention exhibit the unexpected advantage that it is possible to improve impact strength while employing readily accessible, i.e., commercially available polymers. Although the prior art does describe the use of active added polymers (functionalized rubbers, polyolefins), these in each case must be produced separately and generally are available only in small amounts.

The molecular weights in the case of the polyamide are determined as relative solution viscosity (measured according to DIN 53 727 in m-cresol at 25° C. at a concentration of 0.5 g/100 cm³ of solution) and in the case of the polyalkenamer as viscosity number (J) (measured according to DIN 53 726 in toluene at 25° C. and a concentration of 0.5 g/100 gm³ of solution).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees celsius; unless otherwise indicated, all parts and percentages are by weight.

In the examples, the so called notch impact strength tests according to DIN 53 453 were performed on injection molded notched standard small bars at the indicated temperatures. Between the injection molding and tests the bars were stored for about 24 hours at 50% relative humidity (23° C.).

Examples identified by letters are comparative examples and are not according to the invention. There are distinguished 3 different result types of the notched impact strength test:
(1) the test bar stays completely uneffected (=without fracture);
(2) the test bar does not break into two, but is hurted visibly in the notched zone yet (=partially fractured);
(3) the test bar is fractured into two parts, the energy of fracture is noted.

EXAMPLES

Production of polyalkenamers exhibiting functional groups

A commercial polyoctenamer (J: 120 cm³/g; trans-content of the double bonds: about 80%—VESTENAMER® 8012), TOR, is the basis as initial product for the functionalized polyoctenamers used in the examples. Three functionalized polyalkenamers (TOR 1 to 3) were produced.

TOR 1

2 parts by weight of fumaric acid and 98 parts by weight of polyoctenamer were reacted in a twin-screw extruder (Model ZE 40—Berstdorff company) at 310° C. and then granulated. From the comparison of the IR spectrum of the initial product and of TOR 1, purified by reprecipitation of free monomers, it could be recognized that more than or equal to 80% of the fumaric acid is bound.
Gel content: less than 1%
Viscosity number (J): 111 cm³/g

TOR 2

Corresponding to TOR 1 a product was produced of 4 parts by weight of fumaric acid and 96 parts by weight of polyoctenamer.
Reaction temperature: 310° to 315° C.
Gel content: 2 to 3% by weight
Viscosity number (J): 112 cm³/g

TOR 3

Polyoctenamer was epoxidized in chloroform in known way with $H_2O_2$/formic acid and precipitated by stirring in, in methanol. The acid-free washed powdery product contained 7.15% by weight of total oxygen; by titration with 0.1N HCl in tetrahydrofuran an epoxide oxygen content of 6.4% by weight was found.
Gel content: less than 1%
Viscosity number (J): 107 cm³/g

EXAMPLES 1 to 4 and A (Table I)

A commercial polyamide 12 ($Eta_{rel}$:1.91—VESTAMID® L 1901) and a commercial trans-polyoctenamer (J:120 cm³/g; trans-content of the double bonds: about 80%—VESTANAMER® 8012), TOR, are mixed, in the amounts indicated in Table I, in a laboratory twin-screw kneader (Model DSK 42/5—Brabender Co.) at about 220° C. and 25 rpm of the screw, extruded as rope, granulated and dried. The granulate is mixed with 1% by weight of di-t-butyl-peroxide and treated with constant tumbling first for 3 hours at 90° C. and then for 4 hours at 150° C. This treated granulate and polyamide 12 are injection molded into standard small bars under usual conditions and subjected to notch impact testing according to DIN 53 453.

TABLE I

| Example | PA 12* [wt %] | TOR** [wt %] | Notch impact strength [kJ/m²] | | | |
|---|---|---|---|---|---|---|
| | | | 23° C. | 0° C. | −20° C. | −40° C. |
| A | 100 | 0 | 15.6 | — | — | 10.3 |
| 1 | 95 | 5 | 18.2 | 13.8 | 11.8 | 8.7 |
| 2 | 90 | 10 | 11/11 wf*** | 3/11 wf 8/11 pf | 4/10 pf**** 56.4 | 1/11 Wf 27.2 |
| 3 | 85 | 15 | 11/11 wf | 11/11 wf | 1/11 wf 7/11 pf 56.4 | 31.2 |
| 4 | 80 | 20 | 11/11 wf | 9/11 wf 2/11 pf | 5/11 wf 6/11 pf | 1/11 wf 23.0 |

*polyamide 12
**polyoctenamer
***without fracture
****partial fracture(not completly broken into two parts)

EXAMPLE 5

Example 3 was repeated with the difference that peroxide was applied to the granulated molding compound and allowed to diffuse only at 90° C./3 H. Then the granulate thus treated, without further treatment, was immediately injection molded at about 220° C. into standard small bars. The notch impact strength test gave the following values:
23° C.: 7/11 without fracture; 4/11 partially fractured
0° C.: 3/11 without fracture; 8/11 partially fractured
−20° C.: 10/11 partially fractured; remainder: 37.7 kJ/m²
−40° C.: 23.2 kJ/m²

EXAMPLE 6, 7 and B (Table II)

A molding compound according to example 3 was produced by melt mixing. 1% by weight of a stabilized peroxide, consisting of 40% by weight of dicumylperoxide and 60% by weight of polyethylene, was tumbled in a mixer on the granulate thus obtained. This product was first directly injection molded (example 6) at 220° C., then once again before injection molding was regranulated in a twin-screw extruder, whereby the first extruder zone heated to 185° C., the following to 220° C. were maintained and the average stay time was about 3 minutes (example 7). For comparison (example B), without predispersion of the polyoctenamer in the polyamide 12 all 3 components were regranulated at 220° C. in the twinscrew kneader and then injection molded.

TABLE II

| Example | Notch impact strength (23° C.) |
|---|---|
| 6 | 3/11 partially fractured, remainder: 26.5 kJ/m$^2$ |
| 7 | 11/11 partially fractured |
| B | 16.5 kJ/m$^2$ |

EXAMPLES 8 AND C (TABLE III)

A mixture of 5 parts by weight of p-hydroxybenzoic acid[2-ethylhexyl]ester (plasticizer) and 0.5 part by weight of 2,5-dimethyl-2,5-bis(t-butylperoxy)-hexine(3) was allowed to diffuse into 100 parts by weight of a granulated melt mixture of 85 parts by weight of polyamide 12 and 15 parts by weight of polyoctenamer at 70° C. with constant tumbling. After the granulate was superficially dry, the temperature was kept for another 1 h at 70° C. to complete the diffusion. The product obtained was injection molded without further treatment (example 8).

For comparison (example C) 85 parts by weight of polyamide 12 granulate, 15 parts by weight of polyoctenamer granulate and 0.5 part by weight of the peroxide, which was adsorbed on 0.5 part by weight of calcium carbonate for stabilizing and better handling were mixed in a twin-screw kneader at 220° C. and then 5 parts by weight of the above-mentioned plasticizer was incorporated. Then the injection molding took place.

TABLE III

| Example | Notch impact strength [kJ/m$^2$] | | | |
|---|---|---|---|---|
| | 23° C. | 0° C. | −20° C. | −40° C. |
| 8 | 11/11 wf* | 4/11 wf<br>7/11 f** | 20.1 | 16.8 |
| C | 11/11 wf | 23.1 | 13.6 | 12.3 |

*without fracture
**partially fractured

EXAMPLES 9 AND D (TABLE IV)

The operation was as in example 4, with the difference that the polyamide 12 used there was replaced by a low molecular type with an Eta$_{rel}$ value of 1.50.

TABLE IV

| Example | TOR content [%] | Notch impact strength [kJ/m$^2$] | | | |
|---|---|---|---|---|---|
| | | 23° C. | 0° C. | −20° C. | −40° C. |
| D | 0 | 5.5 | — | — | 4.5 |
| 9 | 20 | 11/11 wf | 7/11 wf<br>27.6 | 13.2 | 8.6 |

EXAMPLES 10 TO 13 (TABLE V)

The operation is according to examples 1 to 4 with the exception that a functionalized polyoctenamer (TOR 1) is used.

TABLE V

| Example | PA 12* [wt %] | TOR 1 [wt %] | Notch impact strength kJ/m$^2$] | | | |
|---|---|---|---|---|---|---|
| | | | 23° C. | 0° C. | −20° C. | −40° C. |
| A | 100 | 0 | 15.6 | — | — | 10.3 |
| 10 | 95 | 5 | 24.4 | 16.9 | 16.3 | 13.1 |
| 11 | 90 | 10 | wf** | 3/11 wf<br>8/11 pf | 4/11 wf<br>7/11 pf | 4/11 pf***<br>31.0 |
| 12 | 85 | 15 | wf | 6/11 wf<br>5/11 pf | 5/11 wf<br>6.11 pf | 28.4 |
| 13 | 80 | 20 | wf | wf | 8/11 wf<br>3/11 pf | 2/11 wf<br>9/11 pf |

*polyamide
**without fracture
***partially fractured

EXAMPLE 14

Example 13 was repeated with the difference that the peroxide was applied to the granulated molding compound and allowed to diffuse in at 90° C./3 h. Then the granulate thus treated, without further treatment was immediately injection molded into standard small bars at about 220° C.

In the testing of the notch impact strength all samples were not broken through at 23° C., 0° C., −20° C., just as were 10 out of 11 samples at −40° C. The 11th sample showed a value of 44.9 KJ/m$^2$.

EXAMPLES 15, 16 AND E (TABLE VI)

With the help of a laboratory twin-screw kneader 20 parts by weight of TOR 1 or TOR 2 was incorporated in the melt at 230° C. in 80 parts by weight of a polyamide 12 (Eta$_{rel}$ value: 1.50; ratio of amino/carboxyl end groups: about 4/6) and the mixture was granulated. The pure polyamide 12 as well as the molding compound obtained were injection molded into standard small bars, after the molding compound had been impregnated with 0.7% by weight of t-butylperbenzoate at 90° C./3 h with constant tumbling and then had been treated at 150 C./1 h.

TABLE VI

| Example | TOR type | Notch impact strength [kJ/m$^2$] | | | |
|---|---|---|---|---|---|
| | | 23° C. | 0° C. | −20° C. | −40° C. |
| E | — | 5.5 | — | — | 4.5 |
| 15 | TOR 1 | wf* | 6/11 wf<br>5/11 pf** | 4/11 wf<br>7/11 f | 9/11 pf<br>38.3 |
| 16 | TOR 2 | wf | wf | 3/11 wf<br>8/11 pf | 4/11 pf<br>27.7 |

*without fracture
**partially fractured

EXAMPLE 17

80 parts by weight of a polyamide 12 (eta$_{rel}$: 1.68, ratio of amino/carboxyl groups: 8/2) was mixed with 20 parts by weight of TOR 3 in a twin-screw kneader (Model LSM 30.34- Leistritz Co.) at 236° C. and then granulated. The granulate after treatment (according to examples 1 to 4) with di-t-butylperoxide is injection molded into standard small bars. Testing of the notch impact strength gave the following values:

| 23° C. | 0° C. | −20° C. | −40° C. |
|---|---|---|---|
| w/f* | w/f | w/f | 22.5 kJ/m² |

*without fracture

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An impact-resistant polyamide molding compound comprising an intimate mixture of
   A. from about 60 to about 98% by weight of a polyamide having an $Eta_{rel}$ value in the range of from about 1.2 to about 2.4
   B. from about 2 to about 40% by weight of a polyalkenamer having a viscosity number in the range of from about 50 to about 250 ml/g,
   said mixture having been combined with from about 0.05 to about 5% by weight relative to the sum of components A and B, of an organic free radical former at a temperature sufficient to cause said radical former to decompose into free radicals.

2. An impact-resistant polyamide molding compound of claim 1 wherein said polyamide is present in an amount of from about 70 to about 98% by weight and said polyalkenamer is present in an amount of from about 2 to about 30% by weight.

3. A molding composition of claim 1 wherein said polyamide has an $Eta_{rel}$ value of from about 1.5 to about 2.4.

4. A molding composition of claim 1 wherein said polyalkenamer has a viscosity number of from about 80 to about 160 ml/g.

5. A molding composition of claim 1 wherein said polyalkenamer is functionalized by epoxy groups, such that the content of epoxide oxygen is said polyalkenamer is from about 0.5 to about 9% by weight.

6. A molding composition of claim 5 wherein the content of the epoxide oxygen in said polyalkenamer is from about 3 to about 8% by weight.

7. A molding composition of claim 1 wherein said polyalkenamer is grafted by 0.2 to 5% by weight of an unsaturated monomer containing carboxyl or carboxylic acid anhydride groups.

8. A molding composition of claim 1 wherein said polyalkenamer is prepared from a cyclic olefin having 1–3 rings and which has at least one non-conjugated double bond.

9. A molding composition of claim 1 wherein said polyamide is a homopolyamide selected from PA 11, PA 12, PA 68, PA 69, PA 610 or PA 612.

10. A molding composition of claim 1 wherein the amount of said organic free radical former is from about 0.1 to about 3% by weight relative to the sum of components A and B.

11. A molding composition of claim 1 wherein said organic free radical former is an azo compound or a peroxide.

12. A molding composition of claim 1 wherein said organic radical former is a bis-t-alkylperoxide or a t-alkyl peracid ester.

13. A molding composition of claim 1 wherein the organic free radical former is t-butylperneodecanoate, t-amylperpivalate, t-butylperpivalate, bis-(3,5,5-trimethylhexanoyl) peroxide, dioctanoylperoxide, didecanoylperoxide, dilauroylperoxide, t-butyl-per-(2-ethylhexanoate), t-butylperisobutyrate, t-butylpermaleinate, 1,1-bis-(t-butylperoxy)-3,3,5-trimethylcyclohexane, 1,1-bis-(t-butyl-peroxy)-cyclohexane, t-butylperoxy-isopropylcarbonate, t-butyl-per-(3,5,5-trimethylhexanoate), 2,5-dimethylhexane-2,5, diperbenzoate, t-butylperacetate, t-butyl-perbenzoate, 5-amyl-perbenzoate, 2,2-bis-(t-butyl peroxy)-butane, dicumylperoxide, 2,5-dimethylhexane-2,5-di-t-butylperoxide, t-butylcumylperoxide, bis(t-butyl-peroxy)-3,5-dimethyldioxolane-1,2, di-t-butylperoxide, 2,5-dimethyl-hexine-(3)-2,5-di-t-butylperoxide, bis(t-butyl peroxy -isopropyl)-benzene, 2,2'-azo-bis-(2-acetoxybutane) or 2,2'-azo-bis-(2-acetoxypropane).

14. A composition of claim 11 wherein the decomposition temperature of the organic free radical former is at least 10° C. below the melting temperature of said mixture.

15. A composition of claim 1 wherein the average particle size of the polyalkenamer phase is not greater than about 10 micrometers.

16. An impact-resistant polyamide molding compound comprising an intimate mixture of:
   A. from about 60 to about 98% by weight of a polyamide having an $ETA_{rel}$ value of from about 1.2 to about 2.4,
   B. from about 2 to about 40% by weight of a polyalkenamer having a viscosity number in the range of from 50 to about 250 ml/g, and
   C. from about 0.05 to about 5% by weight relative to the sum of components A and B of an organic free radical former.

17. In a molded product, prepared from a molding composition, the improvement wherein the molding composition is one of claim 1.

18. A method for improving the impact strength of a polyamide molding composition comprising heating a mixture of from about 60 to about 98% by weight of
   A. a polyamide having an $Eta_{rel}$ value in the range of from about 1.2 to about 2.4;
   B. from about 2 to about 40% by weight of a polyalkenamer having a viscosity number in the range of from about 50 to about 250 ml/g; and
   C. from about 0.05 to about 5% by weight, based on the sum of components A and B, of an organic free radical former, the heating temperature being sufficient to cause said free radical former to decompose into free radicals.

19. A method of claim 18 wherein said organic free radical former is added to said mixture in conjunction with other additives or said organic free radical former is added alone or in conjunction with other additives to granules of said mixture, or a solution of said organic free radical former is added alone or in conjunction with other additives to said mixture or to granules of said mixture.

20. A method of claim 18 wherein said heating is part of a subsequent molding procedure.

* * * * *